Figure 4:
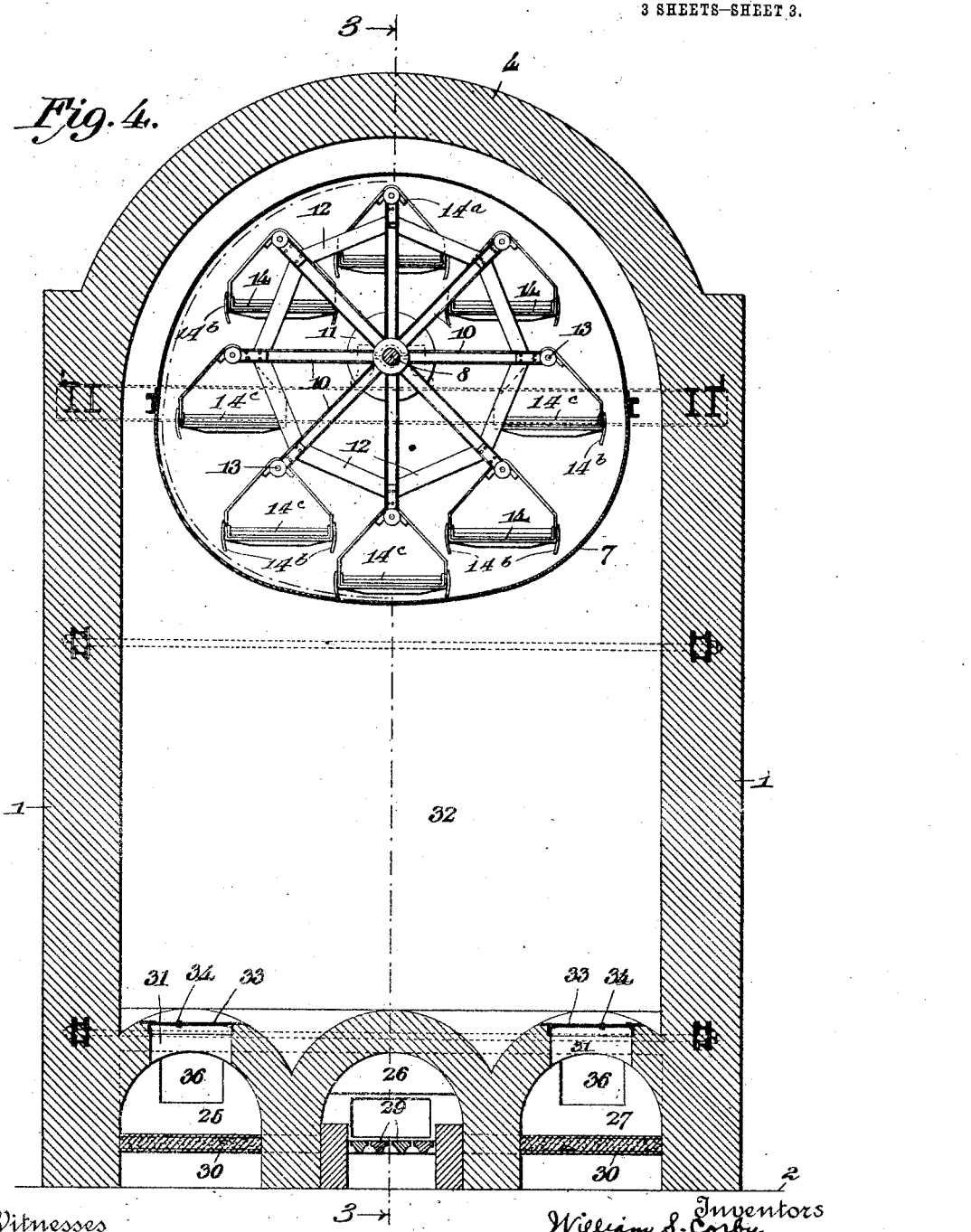

W. S. CORBY & J. L. PARSONS, Jr.
BAKING OVEN.
APPLICATION FILED OCT. 12, 1912.
1,107,195.
Patented Aug. 11, 1914.
3 SHEETS—SHEET 1.
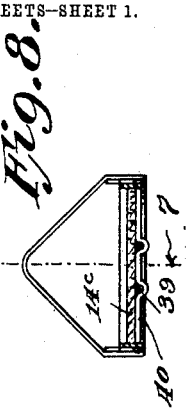
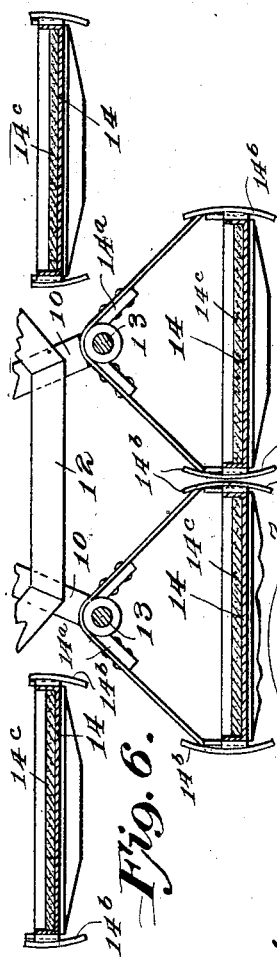
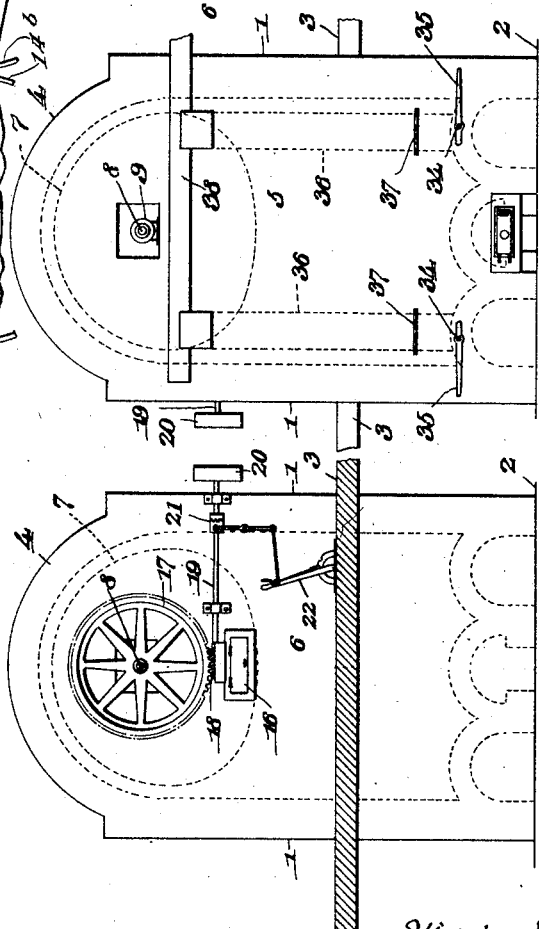
Witnesses
H. H. Lybrand
Stanley W. Cook
Inventors
William S. Corby
James L. Parsons, Jr.,
By H. H. Bliss
Attorney

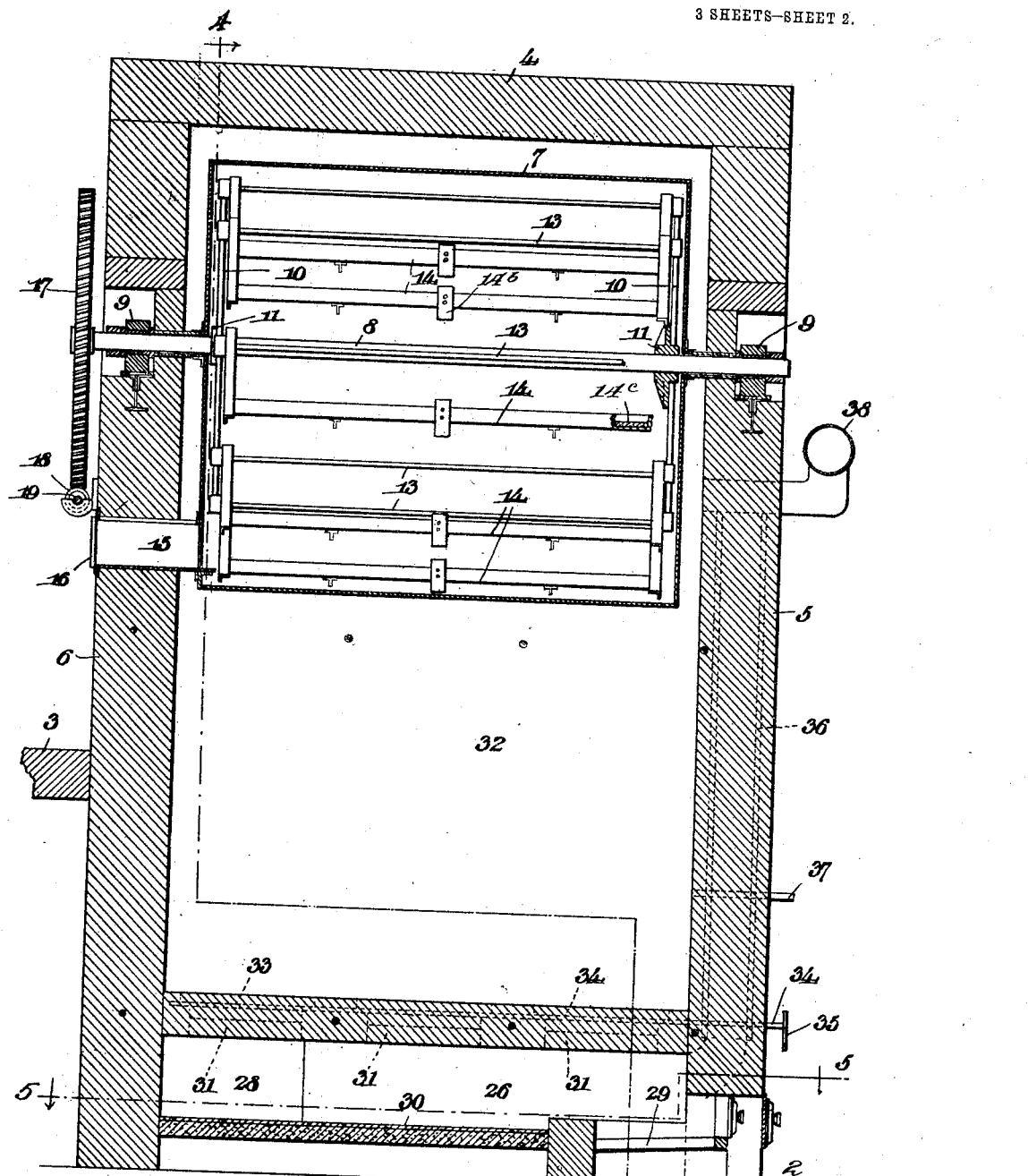

W. S. CORBY & J. L. PARSONS, Jr.
BAKING OVEN.
APPLICATION FILED OCT. 12, 1912.

1,107,195. Patented Aug. 11, 1914.
3 SHEETS—SHEET 3.

UNITED STATES PATENT OFFICE.

WILLIAM S. CORBY AND JAMES L. PARSONS, JR., OF WASHINGTON, DISTRICT OF COLUMBIA.

BAKING-OVEN.

1,107,195.

Specification of Letters Patent.   Patented Aug. 11, 1914.

Application filed October 12, 1912.   Serial No. 725,514.

*To all whom it may concern:*

Be it known that we, WILLIAM S. CORBY and JAMES L. PARSONS, Jr., citizens of the United States, residing at Washington, in the District of Columbia, have invented certain new and useful Improvements in Baking-Ovens, of which the following is a specification, reference being had therein to the accompanying drawing.

This invention relates to improvements in baking ovens of the type particularly adapted for use in bakeries where it is desirable to bake large quantities of bread or other products continuously.

Among the advantages incident to this new form of oven are the doubling of the baking capacity for a given floor space as compared with the type of ovens now generally in use, the adaptability for continuous operation twenty-four hours a day, and economy of fuel resulting from the conservation and utilization of heat.

Some of the objects, therefore, of the invention are to provide an oven constructed to have the advantages mentioned.

Another object is to provide an improved oven so constructed that the bread loaves or other articles being baked are fully protected from the gaseous products of combustion.

Other objects will be apparent from the following specification and claims.

In the drawings which illustrate one embodiment of our invention Figure 1 is a front elevation of the oven, parts of the charging floor being broken away. Fig. 2 is a rear elevation. Fig. 3 is a longitudinal vertical sectional view on the line 3—3 of Fig. 4, parts being broken away. Fig. 4 is a transverse vertical sectional view on the line 4—4 of Fig. 3. Fig. 5 is a horizontal sectional view on the line 5—5 of Fig. 3. Fig. 6 shows in cross section the preferred form of tray bottom on a larger scale. Figs. 7 and 8 are a longitudinal section and a cross section of a modified form of tray bottom.

Referring to the drawings, the numerals 1, 1 indicate the thick vertical side walls of the oven extending in unbroken lines from the first floor 2 up through the second floor 3 and joined at their tops by a semi-circular arch 4 extending from the rear wall 5 to the front wall 6. These walls inclose an insulated heating chamber which is entirely and permanently closed against external communication except at the extreme bottom, as will be hereinafter described.

7 is a baking container positioned in the upper portion of the oven, its walls being separated at all points from the walls of the oven. Preferably the container 7 is quasi-cylindrical in form. The upper portion or half of this cylinder or drum is preferably approximately semi-circular cross section, whereas the lower portion is flattened out to be approximately semi-elliptical in cross section for a purpose which will be later explained.

A shaft 8 extends longitudinally through the oven and end walls of the drum 7. This shaft is supported in suitable bearings 9 set in the end walls 5 and 6 of the oven structure. Spiders comprising radial arms 10 joined at their centers to hubs 11 are secured on the shaft within the ends of the drum 7. The arms 10 of the spiders are braced or stiffened by bars or straps 12. Shafts 13 extend parallel with the main shaft 8 from the ends of the arms 10 of one spider to the ends of the arms 10 of the opposite spider. The swinging bread trays 14 are carried by the shafts 13. As it is desirable to have the bread trays travel in close proximity to the inner surface of the drum 7, the lower half of this drum, as previously described, is flattened out to conform more closely to the lower half of the travel of the swinging trays.

At the lowest point of the drum 7 an opening 15 is provided in the front walls 6 of the oven. Through this opening the bread or other material to be baked is shoved upon the long trays 14. A door 16 closes the opening.

Secured on the front end of the shaft 8 is a large worm wheel 17 meshing with a worm 18 carried by one end of the horizontally arranged shaft 19. This shaft extends across the front face of the oven and has secured to its opposite end a pulley 20. This may be driven from any suitable source of power. A clutch 21 is interposed between the shaft 19 and the pulley 20. The clutch operating lever 22 is positioned adjacent the oven door 16 so that the baker may readily stop the rotation of the reel when a tray registers exactly with the oven door.

A large reduction in gearing is provided so that the drum may rotate at a comparatively slow speed.

The lower portion of the oven is provided, as is particularly well illustrated in Fig. 4, with three longitudinal arched tunnels 25, 26 and 27. A transverse header 28 joins all three tunnels at the front end of the oven. A grate 29 is positioned in the rear of the central tunnel 26, thus converting this chamber into a heat generating furnace. The grate extends a comparatively short distance longitudinally into the tunnel 26, the remaining portion being floored over as at 30 at a height approximately equal to that of the grate bars. In the same manner the tunnels 25 and 27 are floored at the same level as the floor 30. Flues 31 extend from the tunnels 25 and 27 up into the large open space 32. Dampers 33 regulate the passage of gases through the flues 31, their position being regulated by shafts 34 extending out through the rear face of the oven and provided with hand levers 35. Flues 36 extend from the rear ends of the tunnels 25 and 27 up through the rear wall 5 of the oven and are connected to a chimney. The passage of gases into the flues 36 is regulated by dampers 37. The flues 36 communicate with a discharge duct 38. Thus, it will be seen that the oven extends through two floors, the first floor being used for charging fuel into the furnace at the rear of the oven, whereas the second floor is located at a level where the rotating trays can be charged with material to be baked.

As before stated, the oven is adapted to operate day in and day out, twenty-four hours each day. To first start the oven in operation a fire is built on the grate 29, the dampers 33 being closed and the dampers 37 open. It will require approximately twenty-four hours to heat the oven to the proper baking point. A good bed of coals having been obtained, the dampers 37 are closed and the dampers 33 opened, the trays in the rotating reel being then charged with bread and the rotation of the reel started. As the chimney flues are now closed and the flues connecting the arched tunnels 25 and 27 to the chamber 32 open, active combustion will cease and the hot gases generated by the incandescent coals will pass rearward to the header, forward in the tunnels 25 and 27, and upward in the chamber 32. This chamber surrounded by the thick non-conducting walls of the oven, will act as a reservoir of heat communicating it at an even temperature to the drum 7. The heat of the chamber 32 can be easily regulated by operating the dampers 33, 37, so that the proper temperatures for baking different kinds of material can be obtained. The baking temperature will be retained by the oven for a considerable length of time due to the large heat reservoir 32 and the general arrangement of the oven. When, however, the live coals become cooled to a point where fresh fuel is needed to maintain the proper temperature, the flues 33 are closed and the flues 37 connecting with the chimney are opened. Fresh fuel is then charged to the furnace, and when the soot and first products of combustion have passed off through the chimney and the bed of coals become again incandescent, this process requiring approximately from twenty to twenty-five minutes, the chimney flues are closed and the flues 33 opened. The fresh supply of heat is then passed upward into the reservoir 32, this process being, as before stated, such that the oven can be operated continuously without any stops whatever.

A feature of importance is the charging of the bread into the rotating reel at the lowest point in its travel. In this manner, since the drum is air tight, the first steam or moisture arising from the green loaves when first coming in contact with the heat, passes upward through the other trays of bread. The gases caused by the evaporation of the moisture in the dough are in this way retained entirely within the drum. This is found to result in a very superior quality of bread such as cannot be obtained when the gases are allowed to pass out of the oven, or where the gases of combustion come in actual contact with the dough.

The drum inclosing the reel is spaced away from the walls of the oven at all points so as to allow a thorough circulation of the gases contained within the reservoir 32 entirely around the drum.

Since the shaft rotating reel extends longitudinally through the oven, a battery of ovens may be placed side by side without providing intervening spaces for operating mechanism, thus materially economizing in floor space.

The continuous operation of this oven may be likened somewhat to the continuous operation of a steam boiler. Hitherto ovens have been constructed and placed on the market which have been erroneously termed "continuously operating ovens." As far as understood, however, these ovens cannot in actual operation be run continuously, it being necessary in all cases to shut down at least once a day for various purposes. In our oven, however, as in the continuously operated boiler or steam generator, the firing is intermittent and can be continued as long as desired.

The bottoms 14 of the trays are suspended by brackets and bearings 14$^a$ in the shaft 13. They are free to swing and maintain a horizontal position as the reel rotates through its circle of travel. Vertically curved guide shoes 14$^b$ are secured on each side of the longitudinal centers of the trays so as to guide the trays past one another as they are lifted or lowered. This prevents any possibility of the bread pans being upset should one of the journals 14ᵃ stick slightly and prevent its trays from maintaining an exactly horizontal position. By the use of these shoes the trays may be made much wider than would otherwise be the case as it prevents interference between the edges as the trays pass one another. Heavy slabs of soapstone 14ᶜ or other good heat-retaining material are placed in the bottoms of the trays.

In Figs. 7 and 8 we have shown a modified form of tray in which longitudinal rods 39 and transverse rods 40 replace the sheet metal bottoms 14 of the trays and serve to support the soapstone slabs. From actual experience it has been found that the bread has a poor quality, colorless bottom when the pans are supported upon thin sheet metal bottoms, this being due to the fact that heat radiates less readily from thin iron than from a thick, heat-retaining substance such as soapstone.

One of the objects aimed at by the present construction is to greatly reduce the ground area required for an oven of given capacity in comparison with that required for those bread-baking ovens which are commonly in use having long, wide flat stationary hearths. By employing a reel structure of the sort indicated, large pan-carrying trays can be so arranged that at all times many of them are superposed in relation to others, and consequently the ground area can be greatly reduced. And not only are the trays in the present apparatus so arranged as to be in different horizontal planes during their vertical movements, but moreover they are so connected together that this reducing of ground area is carried still further. They are supported at radial distances from the axis so short that there would be danger of their interfering except for the provision herein made of the guiding and buffing devices at 14ᵇ. These are preferably of a shape such as shown. They can be formed by attaching curved strips or bars to the trays and arranged to have their convex surfaces outward. These prevent any of the projecting parts of the trays from catching one with another and insure that they shall successively pass each other although brought close together in their vertical movements. The trays may be made relatively wider and the total pan-carrying area is largely increased.

We are aware of the fact that rotary reel-like carriers have been, and today are, used in the baking of crackers and similar articles, but do not know of oven structures of this class being used for the baking of bread. While bread is being baked, it is well known that the moisture should not be reduced in the immediate neighborhood of the dough and also that the heat should be brought to the several surfaces of the dough, entirely around the loaf, with as much uniformity and equality as possible. One of these ends is reached by making the thin sheet metal drum or casing as tight as possible against the passage of air, gas or vapor it having no communication whatever either with the exterior heat chamber of the oven or with the exterior atmosphere. The moisture and vapors that are given off during the baking process are all retained in this tight inclosure; and to reduce the interior volume, the lower section of the shell or casing is, as above described, flattened so as to bring it as close as possible to the paths of travel of all the points that rotate, thus insuring that the trays while moving through the lower part of their circle shall pass close to the heat-imparting shell, at the bottom, and also, as noted, reducing the cubical volume of the interior to such extent as to keep the moisture or water vapor immediately adjacent to the dough. The second end referred to above is attained partly by this arrangement of the parts of the shell or casing, but largely by providing as pan supports, (not the thin sheet metal which has been heretofore used in cracker ovens adapted to impart a quick, dry heat and which does not possess the capability of absorbing and retaining a large quantity of heat and imparting it through a prolonged period of time, but) floor sections analogous to the refractory, porous, non-metallic stationary hearths which to this day are used in the most successful bread baking ovens. These supports or tray bottoms are illustrated at 14ᶜ in the drawings. They are non-metallic and can be formed of any of several materials adapted for this purpose. We have found that a porous natural stone of the class of soapstone gives the best results because of its lightness and capacity to conserve heat. Each tray bottom can be built up of a number of sections of the non-metallic, porous material used, this depending upon the size. At present, with trays from three to four feet wide and twelve to fifteen feet long, we have found that slabs of the soapstone-like material from one to two inches in thickness are the most efficient. These can be supported either as shown in Fig. 6 directly upon a sheet metal carrier or bottom, or they can be carried in an open framework as shown in Figs. 7 and 8. In the latter construction the heated gases in the interior of the casing are allowed to play directly upon the bottoms of the porous slabs and, at the same time, in case of fracture, the dropping of pieces is prevented.

The vertical height of the oven is very much greater than the horizontal transverse width. The oven walls being approximately twice the combined vertical heights of the fire chamber and baking drum, there remains between the upper surface of the fire chamber and the lower surface of the baking drum a relatively high open chamber and heat reservoir. The air tight baking drum is positioned in the upper part of the chamber and slightly separated at its upper half from the insulated walls of the chamber. The proportions of the heat reservoir or chamber 32 are so great as compared with the size of the baking drum that a very large quantity of heat is stored and transmitted to the drum while the operation of changing fire is going on. Because of this the baking temperature in the air-tight drum is retained at a constant temperature and the fire in the furnace can be attended to without disastrous effect.

What we claim is:

1. The combination of the furnace, the imperforate heavy heat-insulating outer walls inclosing a vertically elongated hot gas space which is permanently closed against any external communication except near the bottom with the furnace, a baking container positioned within the upper part of the said hot gas space at a considerable distance from the bottom thereof and provided throughout with thin permanently gas-tight walls through which heat is readily transmitted to the interior from the said hot gas space, and means whereby material to be baked can be inserted into the container.

2. The combination of the furnace, the imperforate heavy heat-insulating outer walls inclosing a vertically elongated hot gas space which is permanently closed against any external communication except near the bottom with the furnace, a baking container positioned entirely within the upper part of the said hot gas space at a considerable distance from the bottom thereof and having throughout thin permanently gas-tight walls all of which are separated from the said insulating walls and through which heat is readily transmitted at all points from the said hot gas space to the interior of the container, and means whereby material to be baked can be inserted into the said container.

3. The combination of the furnace, the imperforate heavy heat-insulating outer walls inclosing a vertically elongated hot gas space which is permanently closed against any external communication except near the bottom with the furnace, a baking container positioned within the upper part of the said hot gas space at a considerable distance from the bottom thereof and provided with thin permanently gas-tight walls through which heat is readily transmitted from the said hot gas space to the interior of the container, and a relatively small air-tight duct extending through one of the heat-insulating walls to the said container near the bottom thereof, whereby material to be baked can be inserted into the container without substantial loss of heated gases or vapors therefrom.

4. The combination of the furnace, the imperforate heavy heat-insulating outer walls inclosing a vertically elongated hot gas space which is permanently closed against any external communication except near the bottom with the furnace, a baking container positioned entirely within the upper part of the said hot gas space at a considerable distance from the bottom thereof and provided with thin permanently gas-tight walls all of which are separated from the said insulating walls and from the said hot gas space to the interior of the container, and a relatively small air-tight duct extending through one of the heat-insulating walls to the said container near the bottom thereof, whereby material to be baked can be inserted into the container without substantial loss of heated gases or vapors therefrom.

5. The combination of the furnace, the imperforate heavy heat-insulating outer walls inclosing a vertically elongated hot gas space which is permanently closed against any external communication except near the bottom with the furnace, a baking container positioned within the upper part of the said hot gas space at a considerable distance from the bottom thereof and provided with thin permanently gas-tight walls through which heat is readily transmitted to the interior from the said hot gas, space, a rotary pan-supporting reel in the said container, and means whereby material to be baked can be inserted into the container to be carried by pans of the said reel.

6. The combination of the furnace, the imperforate heavy heat-insulating outer walls inclosing a vertically elongated hot gas space which is permanently closed against any external communication except near the bottom with the furnace, a horizontal rotary pan-supporting reel positioned within the upper part of the said hot gas space at a considerable distance from the bottom thereof, a container for the reel provided with thin permanently gas-tight walls through which heat is readily transmitted to the interior from the said hot gas space, the said walls of the container being shaped and positioned to lie substantially equidistantly from all of the pans of the reel, and means whereby material to be baked can be inserted into the container to be carried by pans of the said reel.

7. The combination of the furnace, the imperforate heavy heat-insulating outer walls inclosing a vertically elongated hot gas space which is permanently closed against any external communication except near the bottom with the furnace, a baking container positioned entirely within the upper part of the said hot gas space at a considerable distance from the bottom thereof and having thin permanently gas-tight walls all of which are separated from the said insulating walls and through which heat is readily transmitted at all points from the said hot gas space to the interior of the container, a rotary pan-supporting reel in the said container, and means whereby material to be baked can be inserted into the container to be carried by pans of the said reel.

8. The combination of the furnace, the imperforate heavy heat-insulating outer walls inclosing a vertically elongated hot gas space which is permanently closed against any external communication except near the bottom with the furnace, a baking container positioned within the upper part of the said hot gas space at a considerable distance from the bottom thereof and provided with thin permanently gas-tight walls through which heat is readily transmitted from the said hot gas space to the interior of the container, a rotary pan-supporting reel in the said container, and a relatively small air-tight duct extending through one of the heat-insulating walls to the said container near the bottom thereof, whereby material to be baked can be inserted into the container to be carried by the pans of the reel without substantial loss of heated gases or vapors therefrom.

9. The combination of the furnace, the imperforate heavy heat-insulating outer walls inclosing a vertically elongated hot gas space which is permanently closed against any external communication except near the bottom with the furnace, a damper for optionally cutting off communication between the furnace and the hot gas space, a baking container positioned within the upper part of the said hot gas space at a considerable distance from the bottom thereof, and provided with thin permanently gas-tight walls through which heat is readily transmitted to the interior thereof from the said hot gas space, and means whereby material to be baked can be inserted into the container.

10. The combination of the furnace, the imperforate heavy heat-insulating outer walls inclosing a vertically elongated hot gas space which is permanently closed against any external communication except near the bottom with the furnace, a damper for optionally cutting off communication between the furnace and the hot gas space, a damper controlled flue leading from the furnace to the external air, a baking container positioned within the upper part of the said hot gas space at a considerable distance from the bottom thereof, and provided with thin permanently gas-tight walls through which heat is readily transmitted to the interior thereof from the said hot gas space and means whereby material to be baked can be inserted into the container.

11. In a baking oven, the combination of the baking container, the main outer walls inclosing an insulated chamber in the upper part of which the said baking container is located, the furnace positioned below the insulated chamber, passages at each side of the furnace, the header connecting the passages and the furnace, the dampered smoke flue connecting the said passages with the atmosphere, and the dampered flues connecting the passages with the insulated chamber.

12. In a baking oven, the combination of the main outer walls inclosing an insulated chamber, the gas tight baking container positioned in the upper portion of the chamber, the three parallel tunnels formed in the lower portion of the oven, the fire grate located in the central tunnel, the header connecting the three tunnels at one end thereof, the smoke flues connecting the opposite ends of the two outer tunnels with the atmosphere, and the dampered flues connecting the two outer tunnels with the insulated chamber.

13. In a baking oven, the combination of the main outer walls inclosing a heat insulated chamber, the baking container positioned in the upper portion of the said chamber, three tunnels formed in the lower portion of the oven and insulated from the said container, the header connecting the three tunnels at one end, the fire grate positioned in the central tunnel, the dampered smoke flues connecting the ends of the two outer tunnels with the atmosphere, and dampered flues connecting the two outer tunnels with the heat insulated chamber.

14. In a baking oven, the combination of a rotating reel, baking trays suspended from the periphery of the reel, and a sheet metal drum having its upper portion semi-circular in cross section and its lower portion substantially elliptical in cross section with its inner surface in close proximity to the baking trays.

15. In a bread-baking oven mechanism, the combination of the exterior non-conducting wall inclosing a tight hot gas chamber, the rotary pan-supporting reel positioned in the upper part of the said chamber, the tightly closed sheet metal drum surrounding the reel and supported within the non-conducting wall and having an unobstructed air passage extending entirely around it.

16. In a bread-baking apparatus, the combination of a rotary pan-supporting reel, a tightly closed sheet metal drum entirely surrounding the reel, a furnace structure having walls of non-conducting material extending from a base region up to relatively high points and having an air-tight arched roof part surrounding the top of the drum, and the fire chamber in the base structure of the furnace said fire chamber being constructed and arranged substantially as set forth to provide a relatively deep, wide hot-air chamber situated vertically between the fire chamber and the drum and extending continuously from one of the non-conducting side vertical furnace walls to the other and continuously from the top of the fire chamber to the bottom of the drum, substantially as described.

17. In a bread-baking apparatus, the combination of the oven having non-conducting walls extending vertically from a base to relatively high points and formed with an air-tight non-conducting roof or top, a fire chamber in the base of the oven cut off from communication with the interior chamber above the fire chamber, said interior chamber comprising an upper section adjacent the roof and a relatively deep section immediately above the fire chamber, an air-tight drum in said upper section adjacent the roof or cover, a rotary pan-carrying reel in the said drum, said parts being arranged substantially as set forth to have a deep laterally and vertically unobstructed hot-air chamber between the drum and the furnace, and a reduced unobstructed hot-air chamber extending entirely around the drum, as set forth.

In testimony whereof we affix our signatures, in presence of two witnesses.

WILLIAM S. CORBY.
JAMES L. PARSONS, Jr.

Witnesses:
N. CURTIS LAMMOND,
GEORGE E. EDELIN.